United States Patent
Zweifel et al.

(10) Patent No.: US 7,603,668 B2
(45) Date of Patent: Oct. 13, 2009

(54) DETERMINING THE APPLICABILITY OF PATCHES FOR INSTALLATION ON A COMPUTER SYSTEM

(75) Inventors: Evan R. Zweifel, Fort Collins, CO (US); Joseph M. Webster, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 679 days.

(21) Appl. No.: 10/755,112

(22) Filed: Jan. 9, 2004

(65) Prior Publication Data

US 2005/0188258 A1   Aug. 25, 2005

(51) Int. Cl.
*G06F 9/445* (2006.01)

(52) U.S. Cl. .................. 717/174; 717/168; 717/169; 717/170

(58) Field of Classification Search ......... 717/168–173, 717/174

See application file for complete search history.

(56) References Cited

U.S. PATENT DOCUMENTS

| | | | |
|---|---|---|---|
| 5,619,698 A * | 4/1997 | Lillich et al. ............... | 717/168 |
| 6,100,894 A * | 8/2000 | Goel ........................ | 345/423 |
| 6,363,524 B1 * | 3/2002 | Loy ......................... | 717/170 |
| 7,020,875 B2 * | 3/2006 | Zweifel et al. ............. | 717/168 |
| 2002/0104077 A1 * | 8/2002 | Charnell et al. ............ | 717/162 |
| 2003/0033597 A1 * | 2/2003 | Allsop et al. .............. | 717/169 |
| 2004/0015938 A1 * | 1/2004 | Taylor ..................... | 717/168 |

* cited by examiner

*Primary Examiner*—Wei Y Zhen
*Assistant Examiner*—Junchun Wu

(57) ABSTRACT

A system and/or method determines applicability of patches for installation on a computer system. The method includes determining whether a set of patches is stored in memory of a computer system and, if the set of patches is stored, returning the cached set of patches as an applicability result; and, if the set of patches is not stored, traversing patch chains to encounter patches in the patch chains. Traversing the patch chains begins with start patches, and encountered patches are added to the applicability result.

16 Claims, 5 Drawing Sheets

```
SYSTEMS DATABASE                    ─10

SYSTEM A
        PATCHES INSTALLED
            PATCH_5
            PATCH_8
        FILESET FS1
            FILE A
            FILE B
            * * *
            FILE F
        FILESET FS2
            FILE J
            FILE K
            * * *
            FILE P

SYSTEM B
        * * *

* * *
```

SYSTEMS DATABASE     ─10

```
SYSTEM A
    PATCHES INSTALLED
        PATCH_5
        PATCH_8
    FILESET FS1
        FILE A
        FILE B
        * * *
        FILE F
    FILESET FS2
        FILE J
        FILE K
        * * *
        FILE P

SYSTEM B
    * * *

PATCHES DATABASE     ─20

```
* * *
PATCH_5
    FILESET FS1 (FILE A)
PATCH_8
    FILESET FS2 (FILE K)
PATCH_6
    FILESET FS1 (FILE A, FILE F)
    FILESET FS2 (FILE K, FILE P)
* * *
```

FIG. 2

DETERMINING THE APPLICABILITY OF PATCHES FOR INSTALLATION ON A COMPUTER SYSTEM

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to techniques for maintaining programming systems, and more particularly, to methods for determining the applicability of patches for installation on a computer system.

2. Description of the Related Art

When an operating system, such as Hewlett-Packard's version of UNIX "HP-UX," receives new program files that are to be added to a given system, the files are delivered gathered into filesets having names, such as FS1, FS2, and so on. These filesets are installed on a given system by a process that unpacks and, possibly, uncompresses the files and places them onto the hard disk drive of that system. As in shown in FIG. 1, each fileset can contain a small or large number of files. The FILESET FS1 is shown containing the files FILE A, FILE B, ... and FILE F. Likewise, the FILESET FS2 is shown containing the files FILE J, FILE K, ... and FILE P. Of course, a fileset typically contains many more files than this. Some of these files would be program files, some would be data files, some would be graphic image and multimedia files, depending upon the particular nature of the system and the particular nature of the programming system being installed.

Patches, or corrected/updated sets of files, are also delivered to a system as collections of filesets. In the HP-UX system, it is customary that the filesets in a patch have the same names as the installed filesets. A patch fileset contains updated versions of some (possibly all) of the files in the system fileset having the same name. A given patch PATCH_5 contains new features and fixes or repairs for specific defects. Descriptions of the new features and of the repaired defects are contained in a text file that is maintained in a central database for each patch and that is searchable for words and phrases. Accordingly, a systems administrator may search through the patch text file database and locate patches that repair particular defects or add particular features.

Over time, a first patch may be replaced by a second patch which contains all the fixes and new features of the first patch plus additional changes. These additional changes are called incremental fixes. The new patch then SUPERSEDES the previous patch. With reference to FIG. 4, the PATCH_4 at the root of the patch tree 40 supersedes all of the three patches to the left in this simple linear search tree. Historically, the first patch created was PATCH_1. It was superceded by PATCH 2, which was later superceded by PATCH 3, and that patch was later superceded by PATCH_4 which now resides at the root of the patch tree 40.

In some situations, as illustrated in FIG. 3 at 30 and also in FIG. 5 at 50, two or more patches will be replaced by a single patch. Thus, PATCH_6 SUPERSEDES both the patches PATCH_5 and PATCH_8. This is represented in the search tree by PATCH_6 forming the root of a sub-tree having the two branches PATCH_5 and PATCH_8. Referring now to FIG. 5, the same patch tree shown in FIG. 3 is shown at a later point in time. At some point in time, a new patch PATCH_9 was added which was not part of the original patch search tree but which initially formed a single isolated patch search tree having only one patch element. Then a new patch PATCH_7 was created which combined all of the updates and changes contained in the patches 5, 6, 8, and 9. Even later on, PATCH_7 was superceded by a new patch PATCH_10, thus forming the patch tree 50 shown in FIG. 5. The root patch in the patch tree 50 is the PATCH_10. That patch and PATCH_7 form the trunk of this searchable patch tree, which then branches into two branches, one containing PATCH_9 and another containing PATCH_6; and the PATCH_6 branch of the tree then branches again into the two patches PATCH_5 and PATCH_8. As can be seen, a patch tree can become quite elaborate over time as many patches are combined into a smaller number of newer patches. When placed into a patch tree database, as shown in FIG. 2, a patch tree can be searched in an automated manner.

Patch applications are designed to identify, analyze, and deliver patches to customers. A patch is applicable to a system if at least one of the filesets contained in the patch has already been installed on the system and no successor to the patch is already installed on the system. During the identification phase, algorithms identify starting locations on patch chains and traverse the chains, analyzing the attributes of the patches attempting to identify the most appropriate patch for the customer.

Known patch applications have utilized knowledge about the system being patched. This information includes a list of installed filesets and patches, which may be used to eliminate many non-applicable patches from the search space. Without such information, the patch application is forced to assume all patches for the specified hardware version and operating system version are applicable. Moreover, when performing dependency analysis for patches given only the hardware (HW) and operating system (OS), the patch application must assume that none of the dependents are installed on the computer system. The term "dependent" patch refers to a patch which requires the additional installation of a different patch found on a separate patch tree. As a result, some dependent patches included are unnecessary because they (or one of their successors) are already installed on the customer's system. The ability to quickly and conveniently determine patch applicability is vital when developing complex patch analysis tools.

SUMMARY OF THE INVENTION

Briefly summarized, an embodiment of the invention may be found in a system and/or method which determines applicability of patches for installation on a computer system. The method includes determining whether a set of patches is stored in memory of a computer system and, if the set of patches is stored, returning the cached set of patches as an applicability result; and, if the set of patches is not stored, traversing patch chains to encounter patches in the patch chains. Traversing the patch chains begins with start patches, and encountered patches are added to the applicability result.

BRIEF DESCRIPTION OF DRAWINGS

FIG. 1 presents the structure of a systems database that indicates which files, which filesets, and which patches are installed on each system.

FIG. 2 presents the structure of a patches database that indicates what filesets each patch corrects and which files within those filesets the patches repair or modify or both.

DETAILED DESCRIPTION

A patch application is a program that guides a user or an administrator through the complex process of selecting which software patches to install, taking into consideration their stability as well as the degree of risk that this particular system may be subjected to. Patch applications need to know which patches are applicable to a system. For example, the patch application may need to know if a system is configured correctly to run application X which requires patches A, B, and C. The patch application may need to know if a system is patched according to some requirement which specifies that patches A, B, and C should be installed. Further, the patch application may need to know which of a group of patches containing critical defect fixes can be installed on this system.

Figure 3:
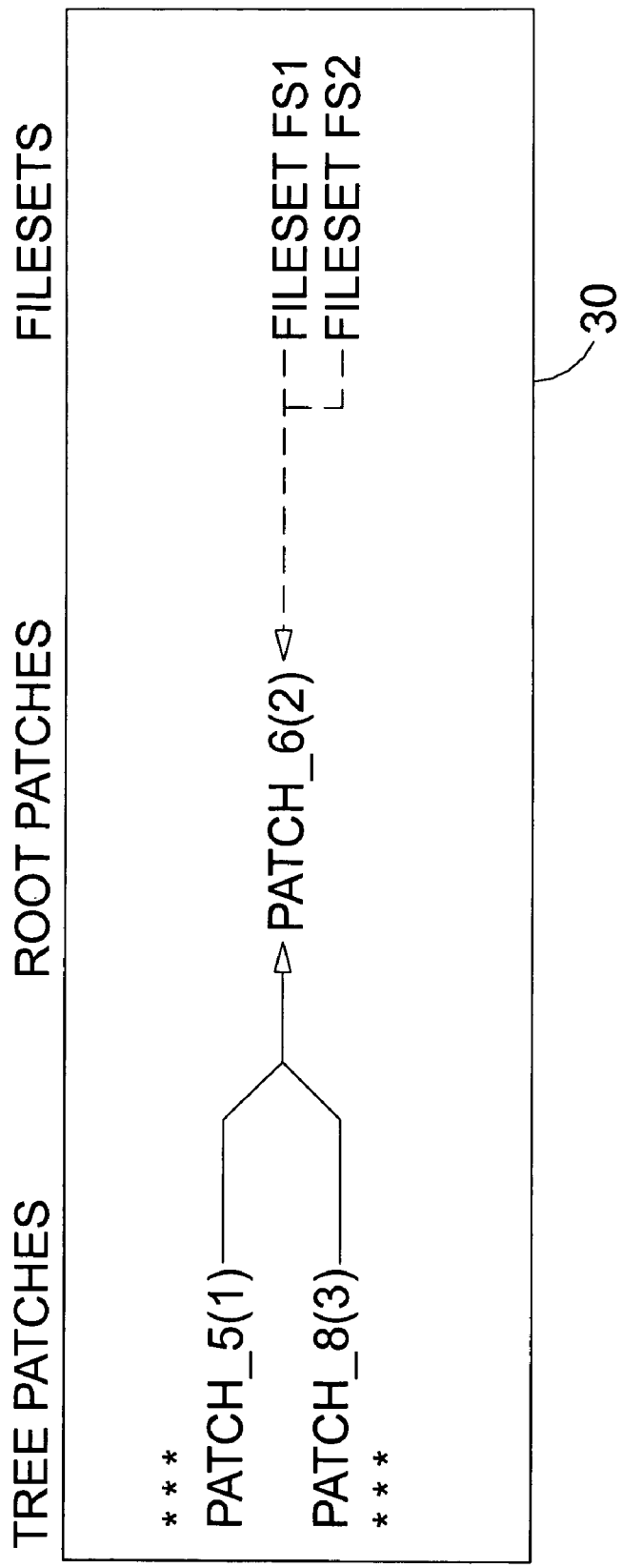
FIG. 3 presents the database structure of a patch tree database showing the root patch for each patch tree, the filesets that each patch tree modifies, and the non-root patches within the branches of each patch tree.
Figure 4:
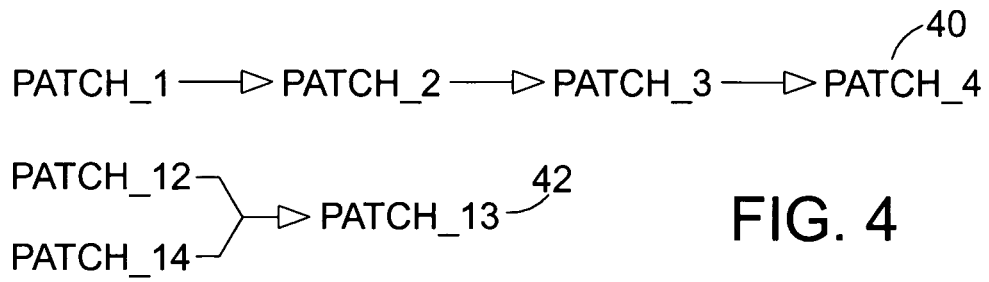
FIG. 4 presents a simple linear patch tree.
Figure 5:
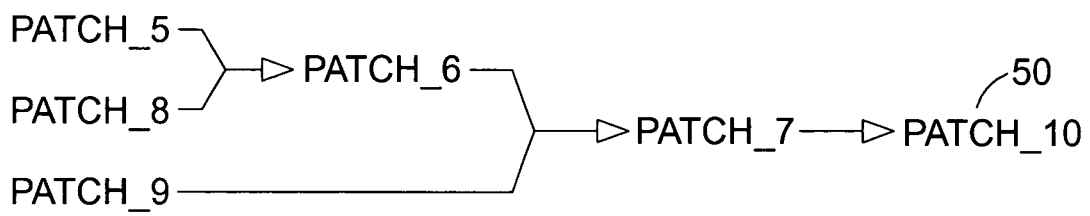
FIG. 5 presents a more complex patch tree with several branches.
Figure 6:
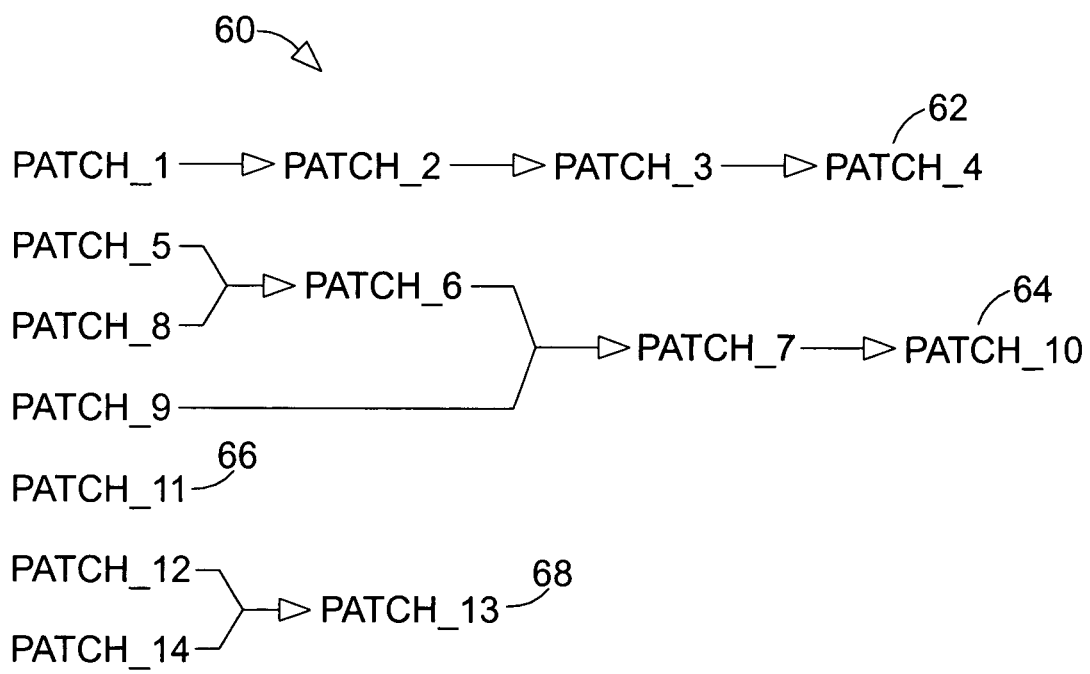
FIG. 6 presents a set of four patch trees, two of which have branches.

FIG. 4 illustrates two exemplary patch chains or trees. A patch tree database contains these trees. A patch tree 40 includes patch_1, patch_2, patch_3, and patch_4. A patch tree 42 includes patch_12, patch 13, and patch_14. Patch_1 is superceded by patch_2. Both patch_12 and patch_14 are superceded by patch_13. Patch_4 is the successor patch for patch_1, patch_2, and patch_3. Table 1 lists the patches and corresponding filesets for these two exemplary patch chains. Each fileset has a fileset start patch that defines where on a patch chain a fileset is introduced. All successor patches to the fileset start patch also included that fileset.

TABLE 1

| Patch | Fileset |
|---|---|
| patch_1 | FS1 |
| patch_2 | FS1 |
| patch_3 | FS1 |
| patch_4 | FS1 |
| patch_12 | FS12 |
| patch_14 | FS14 |
| patch_13 | FS1, FS12, FS14 |

The fileset start patches from FIG. 4 and Table 1 are as follows. The start patches for FS1 are patch_1 and patch_13. The start patch for FS12 is patch_12. The start patch for FS14 is patch_14. In an exemplary embodiment, a fileset start patch table is input to an algorithm and is read at application startup into a hash table to allow fast access. Advantageously, the size of the fileset start patch table is small, generally proportional to the number of filesets.

Given the table of fileset start patches, the start and successor patches that are actually applicable to an unpatched computer system (the "applicability set") can be determined by following the patch chains in the patch tree database starting at the corresponding fileset start patch for each fileset installed on the computer system. Every patch encountered on the chain is applicable. For example, using the example patches above, a computer system containing FS1 and FS12 would have applicable patches patch_1 (and all successors patch_2, patch_3, patch_4) and patch_12 (and successor patch_13).

For a computer system that has not yet been patched but that has many filesets installed, the applicability set can be computed by following all patch chains starting with the appropriate fileset start patches, accumulating all patches as they are visited. The search tree can be improved by stopping any traversal which encounters a patch already in the set. Exemplary software routines for computing a set of all patches, computing a set of start patches, and computing a set of applicable patches are provided in an attached computer program listing appendix. The computation of the applicable patch set for a computer system that has been previously patched can be done in a similar fashion by adjusting the start set appropriately. This computation is done to eliminate parts of the patch chains which are already installed.

Figure 7:
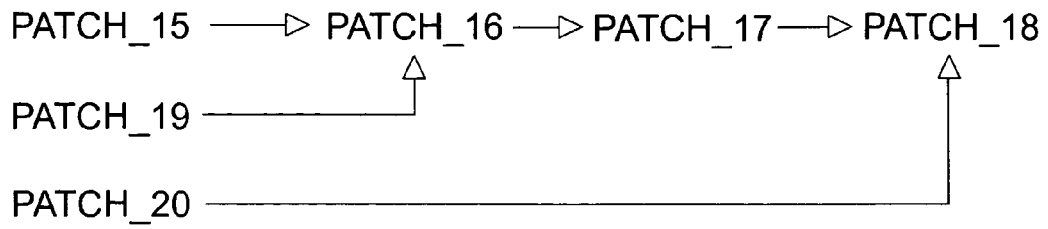
FIG. 7 presents a patch tree.

FIG. 7 illustrates an exemplary patch chain or tree. If the computer system is unpatched, and all of the patches in FIG. 7 are applicable; the set of start patches which define the applicability set is {patch_15, patch 19, patch_20}. However, if a system has patch_16 installed, then the set of start patches which define the applicability set is {patch_17, patch_20}. If patch_17 is installed, the set of start patches which define the applicability set is {patch_20}. If patch_18 is installed, the set is { }.

Figure 8:
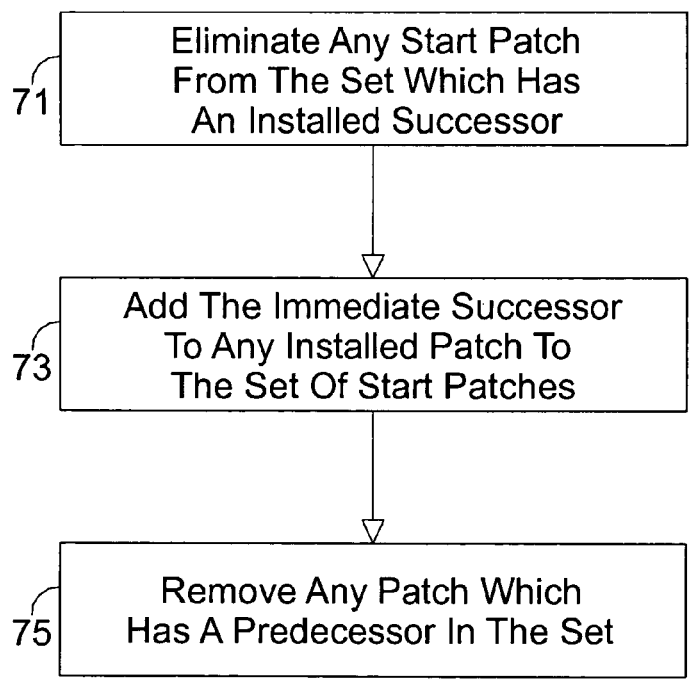
FIG. 8 presents a flow diagram of operations to create a start patches set in accordance with an embodiment of the invention.

FIG. 8 illustrates exemplary operations in the creation of an applicability set of start patches for a patched computer by starting with a corresponding set for the unpatched system. Additional, fewer, or different operations may be performed in various processes for obtaining software patches, depending on the embodiment. In an operation 71 of an exemplary embodiment, any start patch is eliminated from the set which has an installed successor. For example, in the patch chain described with reference to FIG. 7, if patch_16 is installed, patch_15 and patch_19 can be eliminated from the applicability set.

In an operation 73, the immediate successor is added to any installed patch to the set of start patches. Again referring to FIG. 7, if patch_16 is installed, its immediate successor, patch_17 is added to the set of start patches. In an operation 75, any patch is removed which has a predecessor in the set. Thus, if patch_20 is in the set, the predecessor patch_18 can be removed. Exemplary software routines for these operations are provided in the attached computer program listing appendix.

Preferably, the start patches for a system are constant during analysis. As such, computation of start patches needs only occur one time during the execution of the patch application. The same can be said for the applicability set: however, this set may be too large to keep in cache.

Figure 9:
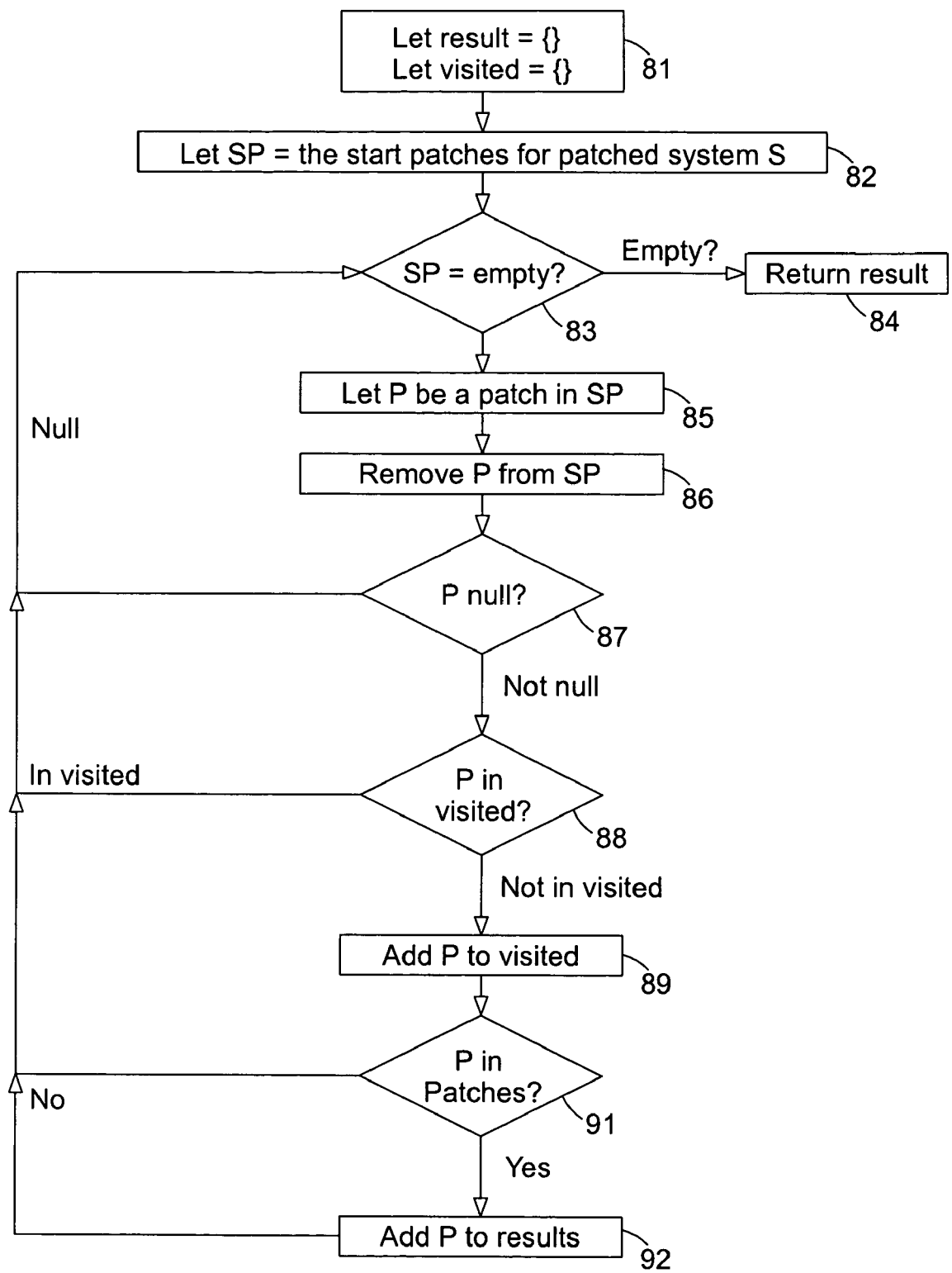
FIG. 9 presents a flow diagram depicting exemplary operations for determining which patches are applicable to a system in accordance with an embodiment of the invention.

FIG. 9 illustrates a flow diagram of exemplary operations to determine if patches are in the applicability set for a system. Additional, fewer, or different operations may be performed in various different embodiments. A system S and a set of patches, Input Patches, are input for the operations and the output is a subset of Input Patches which are applicable to S. In an operation 81, the variables "result" and "visited" are set to empty sets. In an operation 82, SP is set to the start patches for the patched system S. A determination is made in an operation 83 as to whether SP is empty. If SP is empty, this result is returned in an operation 84.

If SP is not empty, an operation 85 is performed in which P is set to be a patch in SP. In an operation 86, P is removed from SP. In an operation 87, a query is made as to if P is null. If P is null, control returns to operation 83. If P is not null, a query is made in an operation 88 as to if P is in "visited." If P is in "visited," control returns to operation 83. If P is not in "visited," an operation 89 is performed in which P is added to "visited." In an operation 91, a query is made as to if P is in "patches." If P is in "patches," P is added to "result" and control returns to operation 83. If P is not in "patches," control returns to operation 83.

By determining patch applicability using fileset start patches as a guide, it is possible to enhance any patch application to deliver only applicable patches to customers without paying significant performance penalties. Additionally, the data which controls the patch application is then small and can be stored efficiently, allowing a solution which does not require a large or complex database.

While several embodiments of the invention have been described, it is to be understood that modifications and changes will occur to those skilled in the art to which the invention pertains. Accordingly, the claims appended to this specification are intended to define the invention precisely.

COMPUTER PROGRAM LISTING APPENDIX

```
/**
*    Compute the set of all patches which includes a set of start
*    patches and all of their successors.
*/
function add_successors (Set : start_patches) : Set
{
    Set result = { };
    for start in start_patches
    do
        while (start != null)
        do
            if (start in result) {
                //     prune the search
                break;
            }
            else {
                //     add the patch to the result
                result = result + start;
            }
        done
    done
    return result;
}
/* Compute a set of start patches for a computer system */
function get_start_patches(s)
{
Set result = { }
// for each installed file set, look up the start patches
// in the hash table and add them to the result.
for fs in s.get_installed_filesets( )
    do
        result = result + start_patch_hash_table(fS)
    done
return result;
}
/**
*    Compute the set of applicable patches for an unpatched
*    computer system.
*/
function compute_applicable_Set_unPatched (System : s) : Set
{
    Set start_patches = get_start_patches(s);
```

```
    return add_successors(start_patches);
}
/**
*    Compute a set of start patches for a system which has been
*    patched.
*/
function compute_start_patches_for_patched_system (System : s) : Set
{
//  see above.
    Set start_set = get_start_patches(s);
    Set result = { };
    for p in start_set
        do
            //search for the patch or any successor on the system
            installed = s.patch_or_successor_installed(patch);
            //if nothing found, add it to the result
            if (installed == null)
                result = result + patch;
            // add the successor to the installed patch to the result.
            else {
                successor = installed.getSuccessor( );
                if (successor != null)
                    result = result + successor;
            }
        done
    // filter out any patches which have a predecessor in the result
    //traverse the patch chains and keep track of visited patches
    Set visited = { };
    for p in result
        do
            // start at the successor and visit all successors of p
            p = p.getSuccessor( );
            while (p != null)
            do
                if (p in visited)
                    break;
                else {
                    visited = visited + p;
                    p = p.getSuccessor( );
                }
            done
        done
    //remove any patch from the result which is also in the visited
    // set.
    Set copy = result;
    result = { };
    for p in copy
        do
            if p not in visited
                result = result + p;
        done
    return result;
}
/**    Compute the set of applicable patches for an unpatched
*      computer system.
*/
function compute_applicable_set_patched (System : s) : Set
{
    Set start_patches =
        compute_start_patches_for_patched_system(s);
        return a dd_successors(start_patches);
}
/**
*    Given a set of patches, determine which ones are applicable
*    to a system
*/
function which_patches_are_applicable (System : s, Set: patches) : Set
{
    Set applicable_set = compute_applicable set_patched(s);
    Set result = { }
    for s in patches
        do
            if (s in applicable_set)
                result = result + s;
        done
    return result;
}
/**
*    Given a set of patches, determine which ones are applicable
```

-continued

```
*       to a system.
*/
function which_patches_are_applicable(System : s
                    Set: patches) : Set
{
    Set result = { };
    Set start_patches = compute_start_patches_for patched system(s);
    Set visited = { };
    // walk all patch chains starting with the start patches
    // for p in start patches
    do
        while (p != null)
        do
            //stop if this chain has been traversed
        if (p in Visited)
            break;
        else {
            Visited = visited + p;
        // add the encountered patch to the result
        if (p in Patches)
            result result + p;
        }
        done
    done
    return result;
}
```

The invention claimed is:

1. A method of obtaining an applicability set of patches applicable to be installed on a given computer system having installed thereon one or more installed files or filesets, the patches residing in a patch database and organized into one or more patch trees each having a root patch, where the root patch is the newest patch in a given patch tree, each patch modifying one or more files or filesets, the method comprising: selecting a set of one or more patch trees each of which contains at least one patch that patches one or more of the given computer system's installed files or filesets; identifying, in the set of the patches that comprise each selected patch tree, one or more start patches, where a start patch is the oldest patch within a selected patch tree that patches one or more particular files or filesets installed on the given computer system; traversing the selected patch trees from each patch tree's start patches and progressing toward each patch tree's root patch, thereby traversing patches in the patch trees; adding the traversed patches to the applicability set; removing any start patch from a set of start patches where the start patch itself is installed on the given computer system and also where the start patch has one or more successor patches in the start patch's patch tree that are installed on the given computer system, a successor patch being an adjacent patch lying closer to the root patch end of a patch tree; and adding to the set of start patches an uninstalled immediate successor patch to such a removed start patch or to its installed successor patch closest to the root patch end of the start patch's patch tree.

2. The method of claim 1, further comprising removing any patch from the set of start patches that has a predecessor patch in the set of start patches, a predecessor patch being an adjacent patch lying farther away from the root patch end of a patch tree.

3. The method of claim 1, wherein the traversing of a patch tree stops when a patch already in the applicability set of patches is encountered.

4. The method of claim 1, further comprising storing the start patches in a start patch table.

5. The method of claim 4, wherein the patches contain program bug fixes and improvements and further comprising reading the start patch table into a hash table at system startup.

6. A computerized, fully automated system implemented by installing one or more computer programs in a computer's memory for aiding in obtaining an applicability set of patches applicable to be installed on a given computer system having installed in its memory one or more files or filesets, where the patches reside in a patch database stored within a computer-accessible memory and are organized into one or more patch trees each having a root patch, where the root patch is the newest patch in a given patch tree, the system comprising: a program-implemented patch search mechanism which can search for and find one or more patch trees that include patches for files or filesets installed on the given computer system; a start patch table stored within a computer-accessible memory that identifies, within each patch tree, the oldest patch or patches that can patch one or more particular files or filesets installed on the given computer system; a program-implemented patch tree examination mechanism which can locate and examine staff patches in patch trees identified by the search mechanism and that can also examine and traverse in the direction of the root patch additional successor patches to any start patch, if any, where a successor patch is an adjacent newer patch lying closer to the root patch end of the patch tree; a program-implemented patch applicability mechanism which collects into an applicability set stored within a computer-accessible memory all patches examined and traversed if an examined patch has not already been installed on the given computer system and if all the newer successors to the examined patch have also not been installed on the given computer system; and a program-implemented start patch adjustment mechanism which removes any start patch from a set of start patches associated with a set of patch trees where the staff patch itself is already installed upon the given computer system or where the staff patch has one or more successor patches closer to the root patch end of the staff patch's patch tree that are already installed upon the given computer system; adds to the start patches an immediate successor patch closer to the root patch end of the patch tree than any removed start patch or than its installed successor patch closest to the root patch end of the patch tree, where the immediate successor patch is an immediate successor to a patch installed on the computer system; and removes any patch from the set of start patches that has a predecessor patch in the set of start patches, where a predecessor patch is an adjacent patch lying farther away from the root patch end of a patch tree.

7. The computerized, fully automated system of claim 6, wherein the patch applicability mechanism determines whether a cached set of patches is stored in a memory of the given computer system and, if a cached set of patches is stored, returning the cached set of patches as an applicability set.

8. The computerized, fully automated system of claim 7, wherein if the patch applicability mechanism determines that a cached set of patches is not stored, the patch applicability mechanism starts with the start patches and examines successive patches in each start patch's patch tree, proceeding towards the root patch end of the patch tree and adding successive patches in the patch tree to the applicability set.

9. The computerized, fully automated system of claim 6, wherein the patch search mechanism can search for and find an identifier for one or more patches that correct a particular defect or that have a particular property or both, and wherein the patch trees of such identifier associated patches are then examined by the patch tree examination mechanism.

10. The computerized, fully automated system of claim 6, wherein the patches contain program bug fixes and improvements and wherein the start patch table is read into a hash table at system startup.

11. A computerized, fully automated system implemented by installing one or more computer programs in a computer's memory for aiding in obtaining an applicability set of patches applicable to be installed on a given computer system having installed in its memory files or filesets, where the patches reside in a patch database stored within a computer-accessible memory and are organized into one or more patch trees each having a root patch, where the root patch is the newest patch in a given patch tree, the system comprising: means implemented by a program for returning a set of patch trees containing patches for patching files or fileset installed on the given computer system; a start patch table stored within a computer-accessible memory that identifies, within each patch tree, start patches which are the oldest patch or patches that can patch one or more particular files or filesets installed on the given computer system; means implemented by a program for traversing in the direction of the root patch the returned patch trees starting at start patches and proceeding to successor patches, a successor patch being an adjacent patch lying closer to the root patch end of the patch tree, to encounter patches in the patch trees beginning with start patches; means implemented by a program for adding the encountered patches to the applicability set stored within a computer-accessible memory; means implemented by a program for removing any patch from a set of start patches that has been installed on the given computer system or where the start patch has one or more adjacent successor patches in the direction of the root patch that are installed on the computer system; and means implemented by a program for adding to the set of start patches an immediate successor patch to a start patch and any successor patches to that start patch in the direction of the root patch all of which are installed on the given computer system, where the immediate successor patch is not installed on the given computer system.

12. The computerized, fully automated system of claim 11, further comprising means implemented by a program for examining the applicability set to determine if certain patches relating to files or filesets installed on the given computer system are already installed on the computer system.

13. The computerized, fully automated system of claim 11, further comprising means implemented by a program for removing any patch from the set of start patches that has a predecessor patch in the set of start patches.

14. The computerized, fully automated system of claim 11, wherein the patches contain program bug fixes and improvements and wherein the start patch table is read into a hash table at system startup.

15. The method of claim 1, wherein the root patch in a given patch tree is a patch that was created later than any other patch in the given patch tree, the root patch being created by a process separate from a process that created the given patch tree.

16. The computerized, filly automated system of claim 11, wherein the root patch in a given patch tree is a patch that was created later than any other patch in the given patch tree, the root patch being created by a process separate from a process that created the given patch tree.

* * * * *

UNITED STATES PATENT AND TRADEMARK OFFICE
CERTIFICATE OF CORRECTION

PATENT NO. : 7,603,668 B2  Page 1 of 1
APPLICATION NO. : 10/755112
DATED : October 13, 2009
INVENTOR(S) : Zweifel et al.

It is certified that error appears in the above-identified patent and that said Letters Patent is hereby corrected as shown below:

In column 8, line 19, delete "staff" and insert -- start --, therefor.

In column 8, line 33, delete "staff" and insert -- start --, therefor.

In column 8, line 34, delete "staff" and insert -- start --, therefor.

In column 8, line 35, delete "staff" and insert -- start --, therefor.

In column 10, line 26, delete "filly" and insert -- fully --, therefor.

Signed and Sealed this

Nineteenth Day of January, 2010

David J. Kappos
*Director of the United States Patent and Trademark Office*